UNITED STATES PATENT OFFICE.

PERCY GERALD SANFORD, OF LONDON, ENGLAND.

METHOD OF MAKING TANNING EXTRACTS.

SPECIFICATION forming part of Letters Patent No. 626,100, dated May 30, 1899.

Application filed November 19, 1897. Serial No. 659,181. (No specimens.)

*To all whom it may concern:*

Be it known that I, PERCY GERALD SANFORD, Fellow of the Institute of Chemistry, analytical and consulting chemist and assayer, a subject of the Queen of Great Britain and Ireland, residing at 20 Cullum street, in the city of London, England, have invented certain Improvements in the Treatment of Tanning Liquids for Clarifying, Bleaching, or Decolorizing Them, of which the following is a specification.

My invention has for its object to effect the clarifying, bleaching, or decolorizing of tanning liquids more efficiently, expeditiously, and economically than has hitherto been attained.

It has been proposed to treat tanning liquids or liquids intended for the production of what is known as "tanning extract" by means of albuminous matter, which on coagulation precipitates and carries down with it coloring or other matter which it is desirable to remove. As hitherto conducted the process has not been efficiently performed, owing to a considerable amount of albumin being held in solution. On account of the liquor in question being treated with sulphuric acid, sulph-hydrate of ammonium, or the like, this albumin or its products would afterward give rise to injurious or objectionable chemical action, resulting in or through the generation of gases and other injurious products, thereby causing injury—that is, loss of tannin—and clogging of the filters, where filters are used, and impeding the breaking up of the coagulum or coagulated material and preventing or impeding the separation of the coagulum by means of decantation and incrusting and diminishing the effectual working of the concentrating apparatus through which the tanning liquors are passed subsequently to the treatment with albumin, as well as causing waste of albuminous matter. According to my invention I overcome these objections by adding to the albuminous matter (which may be of animal or vegetable origin) an alkaline fluoride, preferably ammonium fluoride or boro fluoride of an alkali or equivalent agent, then adding the albumin so treated to the aforesaid tanning liquors, and on the application of heat or on the addition of picro-citric acid I cause the albumin to be completely or practically completely coagulated. The coagulated albumin precipitates and carries down with it out of the supernatant liquid coloring-matter or other matter the removal of which is the object of the process, the whole or practically the whole of the albumin being coagulated and precipitated by the means described. The precipitated matter and the decolorized, clarified, or bleached supernatant liquor are separated by filtration, decantation, or other suitable means, and the liquor can be concentrated in the usual or any suitable manner. I prefer to heat the liquor up to or about the same temperature as that of the concentrators before it passes thereinto in order not to cool the liquor undergoing such concentration and cause the formation of insoluble anhydrites of the tannin.

The water used for the purpose of effecting the infusion of the matter containing tannin, after the removal of obnoxious bi-carbonates, sulphates, and organic matter of an injurious nature, is preferably treated by means of an agent for the purpose of destroying injurious germs or otherwise preventing the development of nascent gases or the precipitation of objectionable bases of elementary substances which are conducive to the production of acetous or other fermentative action. Suitable agents for this purpose are hydro-fluoric acid, an alkaline fluorine, boracic acid, or borate of sodium, potassium, or both the fluoric and boracic compounds may be used by adding the same to the wood or other materials undergoing or to undergo extraction. The infusion of tanning matter obtained is run off into a vat and subjected to the treatment hereinbefore described.

In order that my invention may be well understood, I will now give examples of the best methods with which I am acquainted for carrying it into effect, premising that I do not limit myself to the precise details given by these examples.

*Example 1. The treatment of tanning liquors by means of a vegetable albuminous matter which has been treated with ammonium fluoride and dialyzed.*—The decolorizing solution may be made by combining one part, by weight, of ammonium fluoride with one hundred and fifty parts, by weight, of bran or other vegetable albuminous matter. This ammonium fluoride is, however, first dissolved in sufficient water to dissolve it at 25° to 35° centigrade. If desired, also, the albumin may be first extracted by pressure and filtration from the bran or other like matter in order to get rid of the cellulose or other foreign matter which might interfere with the subsequent operation. The solution of ammonium fluoride having been thus added to the albuminous matter, the mixture is then put into a dialyzer to remove all trace of free fluoride. Boracic acid may be added, this being done preferably after dialysis is complete. Having determined the strength of the solution of albumin—i. e., the quantity of albumin or active material present in the solution—it is added to the solution of tannin. It is recommended that the density and the temperature of the two solutions should be as nearly as possible the same in order to avoid "chill" in the albumin solution on coming into contact with the tannin solution. Stirring is then effected so as to cause complete mixture, and the temperature is raised to about 65° centigrade, when coagulation takes place. The vat in which the process takes place should be of such a size that the loss of temperature does not exceed 3° to 4° centigrade in from three to four hours, especially when the liquor is to be separated by deposition rather than filtration.

*Example 2. The treatment of tanning liquors by blood and ammonium fluoride.*—When blood or animal albumin is used, it may be prepared by treatment with fluoride of ammonium or the like, as described in the Specification of United States Letters Patent No. 607,281, granted to me July 12, 1898. The tanning liquor from the maceration or decoction is passed over a suitable cooler, where it is cooled down to 20° to 25° centigrade one-quarter to one-half of a liter of the decolorant per hecto liter of liquor to be decolorized. Thus one hundred liters of liquor at 2.5° Baumé weighing one hundred and one thousand seven hundred grams at 15° centigrade (water being taken as one thousand) require from two hundred and fifty-four to five hundred and ten grains of decolorant of an equal density. The addition of the decolorant may be conveniently made as the liquor is running into the vat, which insures complete mixture when properly conducted, when there is added a strong solution of picro-citric acid, made by dissolving ten parts of picric acid and twenty parts of citric acid and in seven hundred and seventy parts of water. The quantity of this solution which it is necessary to add is from one-eighth to one-fourth part of the total quantity of active material contained in the decolorant. The object of the picro-citric acid is to rid the liquor of all traces of existing albumin or other precipitable substances without having recourse to ebullition. This process, although effectual in the case of liquors of from 1° to 2.5° Baumé, is not applicable to those of a higher density.

When heat is used in place of picro-citric acid, the cooled liquor is treated, as described, by means of the decolorant and well mixed. The temperature is then raised to effect coagulation, which takes place about 63° centigrade, at which temperature it is maintained for about three hours. The coagulated material having subsided, the clear liquor is withdrawn to the concentrators, the liquor, including the deposit in the decolorizing-vat, passing to the filter-press.

If the tanning liquor prior to decolorization be acid, it should be partially neutralized, and this may be effected in the following manner. The acidity is determined and may be calculated as sulphuric acid, ($H_2SO_4$.)

*Solution for neutralizing acidity.*—Sodium borate, 37.5 grams; sodium hydrate, 0.9 grams, dissolved and made up to one liter with distilled water. Twenty cubic centimeters of this solution will neutralize 0.196 grams of acidity calculated as ($H_2SO_4$) sulphuric acid.

In dealing with large quantities of liquor it is better to add the material in the dry form.

The product of the treatment of albumin by an alkaline fluoride, as described, is a preparation which, unlike ordinary albumin, will keep from decomposition for practically an indefinite time. It is probably a fluor-albumin.

I claim as my invention—

The clarifying, bleaching or decolorizing of tanning liquids, by first subjecting albuminous matter to the action of alkaline fluoride and dialyzing the said matter so treated, then subjecting the tanning liquids to the action of the said albuminous matter so treated and dialyzed and finally coagulating the albumin, substantially as hereinbefore described.

In testimony whereof I have signed my name to this specification in the presence of two subscribing witnesses.

PERCY GERALD SANFORD.

Witnesses:
JAMES ARTHUR MALAM,
HENRY DENIS HOSKINS.